Figure 1:
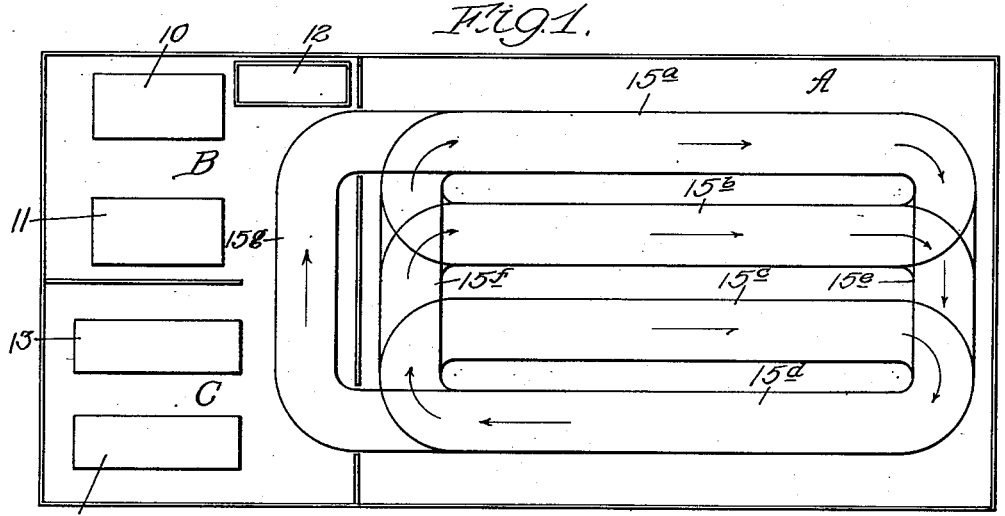

Sept. 18, 1951 R. MIOLLIS 2,567,957
CHEESE HANDLING APPARATUS
Filed Oct. 20, 1945 4 Sheets-Sheet 1

Inventor:
Raymond Miollis,

Sept. 18, 1951 R. MIOLLIS 2,567,957
CHEESE HANDLING APPARATUS
Filed Oct. 20, 1945 4 Sheets-Sheet 2

Inventor:
Raymond Miollis,

Sept. 18, 1951  R. MIOLLIS  2,567,957
CHEESE HANDLING APPARATUS
Filed Oct. 20, 1945  4 Sheets-Sheet 3
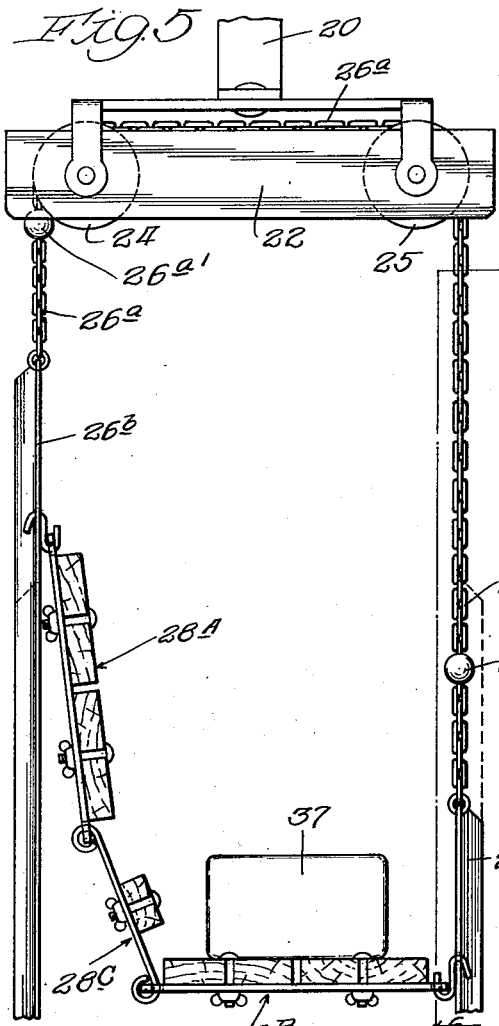
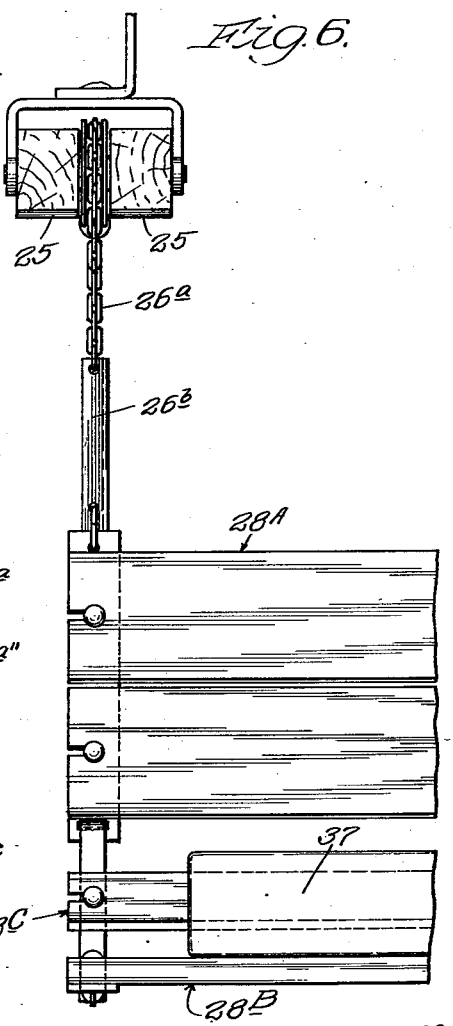
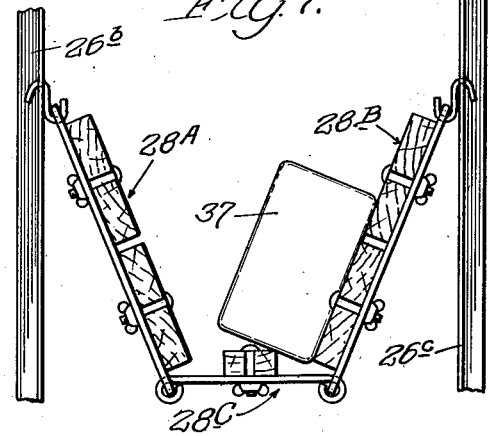
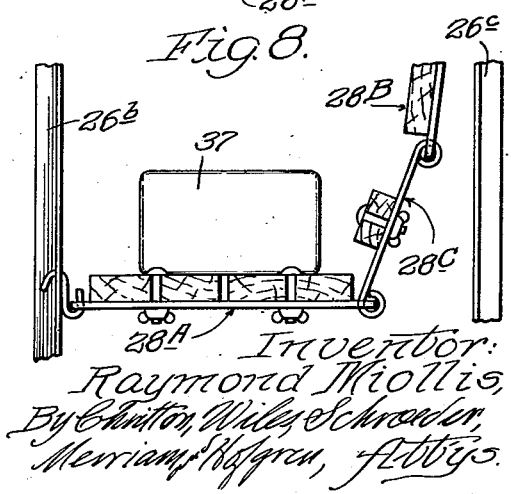

Sept. 18, 1951 R. MIOLLIS 2,567,957
CHEESE HANDLING APPARATUS
Filed Oct. 20, 1945 4 Sheets-Sheet 4
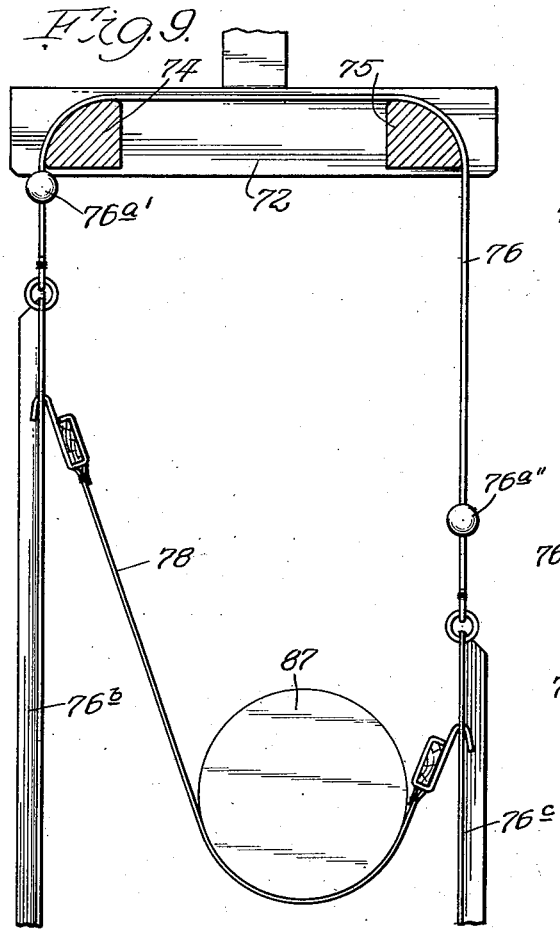
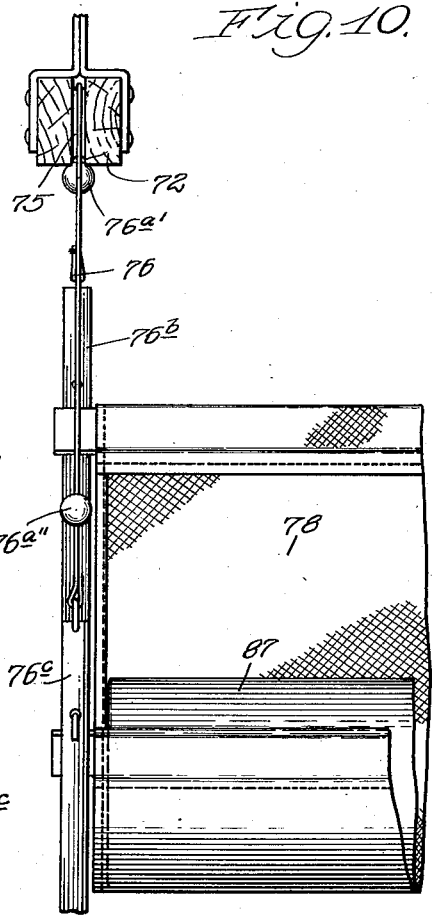
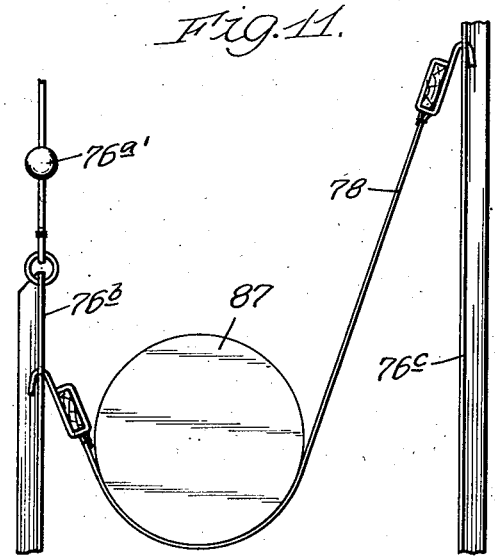
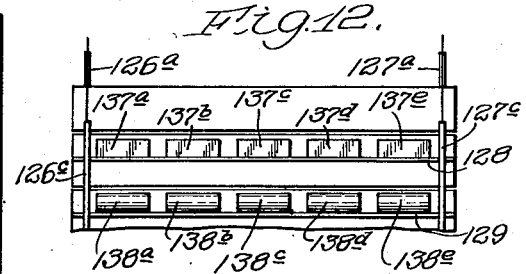
Inventor:
Raymond Miollis, Patented Sept. 18, 1951

2,567,957

UNITED STATES PATENT OFFICE 2,567,957

CHEESE HANDLING APPARATUS

Raymond Miollis, Maywood, Ill., assignor to The Borden Company, New York, N. Y., a corporation of New Jersey Application October 20, 1945, Serial No. 623,477

8 Claims. (Cl. 31—49)

This invention relates to cheese handling apparatus and methods, and particularly to apparatus and methods for handling cheese during the curing thereof.

Natural cheese, to have proper qualities, must be cured for a considerable period in a curing room having carefully controlled temperature and humidity conditions. During this curing procedure the cheese must be inverted at frequent intervals, as once every day or two, and in some cases it must be removed from the shelves or other carrying means for the cheeses and washed several times during the curing process. The handling incident to these phases of the curing process has heretofore required considerable labor, and has been a substantial factor in the cost of cheese. A curing room might contain something in the order of 60,000 pounds of cheese, as a representative example, in individual cheeses ranging from a few pounds each up to large wheels, or in blocks which might be in the neighborhood of 45 pounds per block in the specific cheese making process which I prefer, of either rectangular or cylindrical form. The mere turning over of these cheeses would require at least six man-hours per day, generally in the form of a team of two men working for about three hours; and the time just stated is in connection with strong and well-trained men, working fast.

I am here disclosing and claiming apparatus and methods which have been developed to avoid the labor incident to turning over cheese in the curing rooms by hand methods always used heretofore. I eliminate fixed shelves in the curing room and make use of flexible carrying means on which the cheese is adapted to be placed during curing. Moreover, I support the carrying means in vertical rows by movable supporting means adapted to have part thereof moved vertically, when desired, to effect simultaneous automatic inverting of the entire row of cheeses, whether in the form of individual cheeses or in the form of blocks intended to be subsequently cut into smaller size units.

Other principal features of the apparatus and methods which I am here disclosing comprise the fact that transfer of the cheese from the salting room to the carrying means, from the carrying means to a table or the like when it is desired to wash the cheese, and back to the carrying means, and final removal of the cheese from the carrying means after the curing period is completed, are all greatly facilitated. Improved handling in these respects is attained partly by mounting the individual cheese carrying arrangements, comprising only one or two vertical rows of cheese carrying means and the supporting means therefor, to be independently movable on overhead trackways; and partly by the fact that the cheese can be easily put on to and taken off of the carrying means by use of a transfer board and inverting of the cheese and board in the carrying means.

Figure 2:
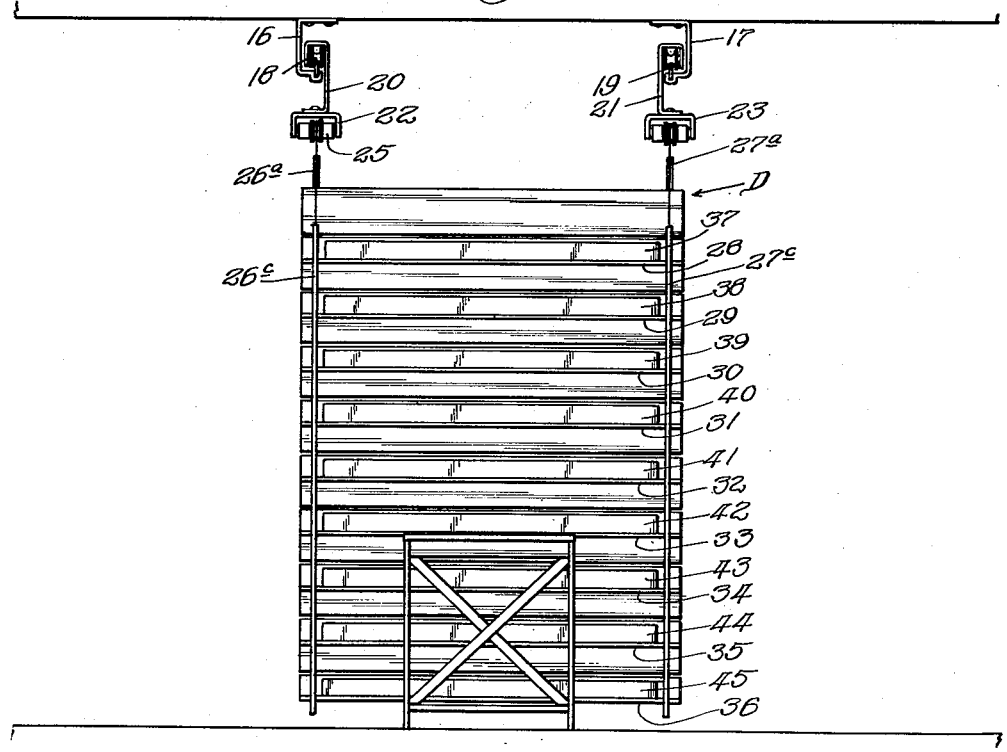
Figure 3:
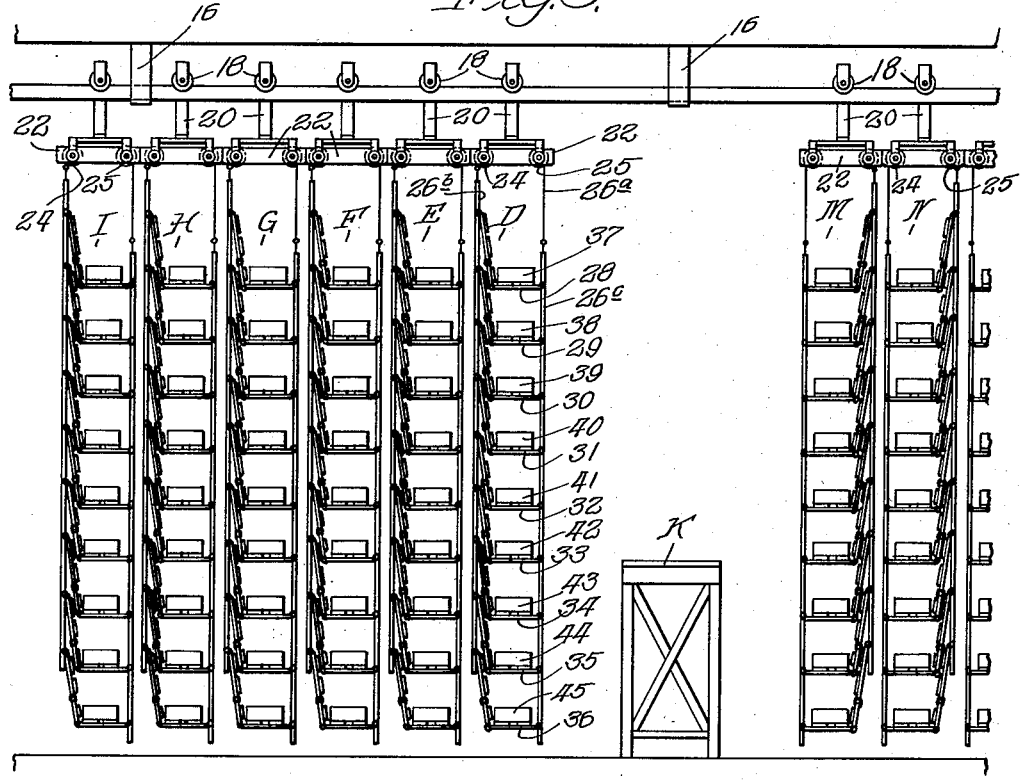
Figure 4:
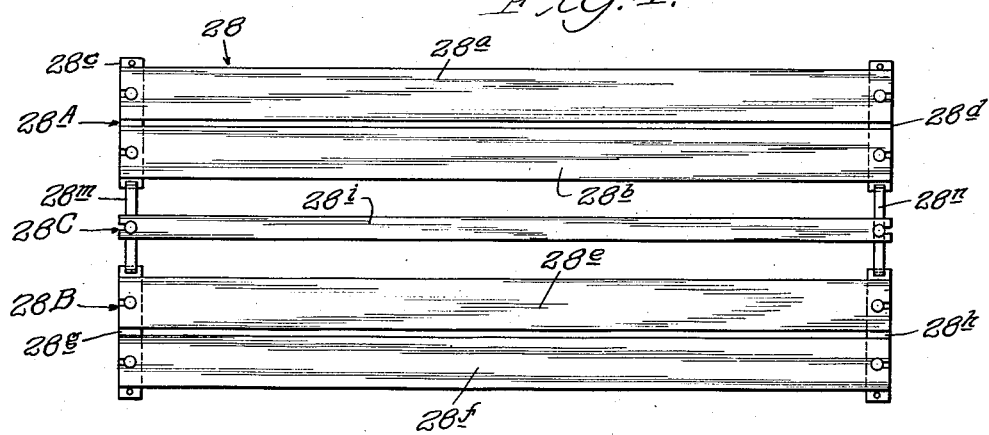

Other features and advantages of this invention will be apparent from the following specification and the drawings, in which:

Figure 1 is a plan of one type of curing room and associated sections in a cheese making plant; Figure 2 is a side elevational view of one cheese carrying arrangement and the trackway on which it is movable; Figure 3 comprises an end elevational view of a plurality of cheese carrying arrangements, with a washing table between certain ones thereof; Figure 4 is a plan view of one cheese carrying means, lying in a plane; Figure 5 is an enlarged end elevational view of a cheese carrying arrangement with a cheese shown in one position on one portion of an individual cheese carrying means; Figure 6 is a fragmentary view of the apparatus shown in Figure 5 from the right side thereof, along the line 6—6; Figure 7 is a fragmentary view of the apparatus shown in Figure 5, with the cheese in the process of being inverted; Figure 8 is a fragmentary view of the apparatus shown in Figure 5 with the cheese completely inverted; Figure 9 is an end elevational view, partly in section, of another form of carrying means and supporting arrangement embodying my inventions; Figure 10 is a side elevational view of the apparatus shown in Figure 9, looking from the right thereof, partly broken away; Figure 11 is a partial fragmentary elevational view of the apparatus shown in Figure 9 showing the cheese inverted; and Figure 12 is a partial elevational view of a cheese carrying arrangement similar to that of Figure 2 with individual cheeses thereon.

The present invention relates particularly to handling apparatus and methods concerned with curing procedures used in making natural cheese as distinguished from the so-called "processed cheese." My improved handling methods and apparatus are of advantage in connection with the curing of natural cheese in any form or size and made by any method, and while I shall immediately hereafter describe one particular complete process of cheese making in order that the inventions I am here claiming may be fully understood, it is to be understood that no limitations are to be implied from such description.

In a process of the kind which I have employed commercially, and which I will describe as a representative complete process, large batches of milk, as ten thousand pounds at a time, are coagulated into curd which is pressed and cured in relatively large-size blocks which are, after curing, cut up into small loaves or pieces which may be only half a pound or a pound each. I have made a number of inventions in connection with apparatus and methods for making natural cheese and have had a number of patents issued to me thereon. One of my issued patents, No. 2,103,545 of December 28, 1937, gives a full description of a complete process of the kind in which the apparatus here being disclosed may be used. Accordingly, only a very brief description will be given here of the complete cheese-making process which I am describing as illustrative, reference being made to the above patent to supplement the present disclose in such regard.

The apparatus for the entire cheese-making process includes as its principal elements a cheese vat, a molding vat, cheese molds or forms, a cheese press, and curing, cutting and packaging arrangements. The cheese vat receives a substantial quantity of milk and certain additives, and these are then agitated and worked until cheese curd of the desired type is formed, whereupon a substantial proportion of the whey associated with such curd is drained. The cheese curd and residual whey associated therewith may then be transferred to a molding vat where the curd has substantially all of the remaining whey drained therefrom and where some initial pressing and compacting may be done to cause knitting of the curds. The partially knit cheese in the molding vat may ben then cut into rectangular blocks of uniform size and substantial length, as extending the full width of the molding vat, and these blocks may then be pressed in the mold or forms and subjected to pressure in the press. During the pressing operation the cheese is subjected to certain handling between portions of the pressing procedure. After the pressing is completed the blocks are subjected to a salting treatment, as by being soaked in brine for several hours, to inhibit certain further changes in the cheese, and then the cheese is cured.

The curing is generally effected in a cellar, although any curing room of the proper humidity and temperature is satisfactory. During the curing period, which may for example be 30 days or more, the cheese must be frequently inverted, must be inspected for mold, swelling, or any other signs which would show that a particular batch was spoiling, and generally it is occasionally washed or oiled and brushed. After the cheese blocks have been cured, they are removed from the carrying means on which they have rested in the curing room and are cut into the desired small size and packaged. If the cheese blocks in the curing room are rectangular the blocks are cut into loaves or bricks which may be of one or two pounds each, for example, or somewhat larger if desired; and if the blocks have been formed in a large cylinder, they are cut transversely into small wheels. In any event, these smaller units comprise the final product which is appropriately packaged, as by being waxed and wrapped, and sold to the ultimate consumer.

The foregoing description is intended to describe one complete process in which my improved handling apparatus and methods may be used in connection with the curing, so that the specification may be hereafter limited to that part of the cheese making process with which this application is particularly concerned, and yet so that the remainder of the specification may be understood and properly related to one particular form of complete cheese making process. It will be understood, of course, that my improved handling apparatus and methods can be used in connection with other types of cheese making processes other than the particular one which I have described briefly herein and more fully in my above-mentioned patent and in other of my patents.

In the particular plant layout shown in Figure 1, one floor, as the basement, is here shown as comprising a curing room here identified as A, a press and brine tank room here identified as B, and a packaging room here identified as C, it being understood that in the particular plant illustrated phases of the cheese making prior to pressing are accomplished elsewhere, as on an upper floor. In this particular figure merely intended as a representative example to make my invention more readily understandable, the room B is shown as provided with a pair of presses 10 and 11, which may be of the type shown in my Patent 2,103,545, for example, or the improved type shown in my application Ser. No. 562,577; and with a brine tank 12 where the cheese blocks may be salted after pressing and before being put in the curing room. The packaging room C is shown as provided with a pair of tables 13 and 14 at which the wrappers may sit to package the cheese in final form.

Both of these rooms are shown as separated from the curing room A. The latter is here shown as having a plurality of pathways therein here shown as comprising longitudinally extending sections 15a—d and transversely extending portions 15e, 15f and 15g, the latter extending across the space between two openings in the wall or partition dividing the curing room A from the rooms B and C, and not being in the curing room. The paths thus provided by trackways in the manner more fully described hereafter comprise paths in which the cheese carrying arrangements adapted to carry the cheeses during curing are independently movable, switches being provided in the trackways in conventional manner to enable these curing arrangements to be moved around in any desired manner in the various paths provided.

For example, cheese blocks taken out of the brine tank 12 can be conveniently loaded on cheese carrying arrangements on the upper end (speaking with respect to the position in Figure 1) of the pathway section 15g, and then moved into the curing room by moving the carrying arrangements to the right along the path 15a. The handling arrangement carrying the cheese can be left on the pathway 15a or, as more cheese is brought into the curing room behind it, moved over on to one of the intermediate passageways 15b or 15c. Preferably the carrying arrangements would be moved along intermittently, as in connection with the inverting and washing procedures, in such manner that they would be on the pathway 15d at the end of the curing period and could be readily run out into the packaging room C, where the cheese blocks could be removed, cut, and packaged. The empty carrying arrangements can then move across in the pathway 15g to the press and salting room to be reloaded. It will be seen that this provides a continuous operation which avoids a great deal of the trucking of cheeses on hand carts, and loading and unloading from the hand carts, which has heretofore been necessary in cheese making plants.

Referring now more particularly to Figures 2 and 3, the carrying arrangement D, for example, is shown as supported from an overhead trackway comprising a pair of members 16 and 17 supported from overhead in any suitable manner, as from the ceiling. The members 16 and 17 are adapted to have wheels 18 and 19 ride thereon, these being journalled in and carrying depending brackets 20 and 21. The brackets in turn support channel members 22 and 23 in this specific embodiment.

The spacing between the centers of the channel members should be of the same order as the length of the cheese blocks to be handled, or preferably slightly longer. In one specific example where the cheese blocks to be handled are 54 inches long, the spacing between centers is 58 inches. Each of the channel members is here shown as serving as a movable mounting arrangement, as by virtue of the pulleys 24 and 25 mounted therein, for supporting means at each end of the arrangement. While the trackway members, brackets, and the like are here shown as in duplicate, it will be understood that it would be equally satisfactory in many cases to support the arrangement entirely from a single central overhead trackway member.

Inasmuch as the arrangements at each end are identical, only one end will be specifically described, reference being now had more particularly to Figure 3. The supporting means at the end of the arrangement D there visible in general constitutes means in the shape of an inverted U, with an upper flexible portion, as the chain part 26a, passing over the pulleys 24 and 25, and with spaced downwardly extending vertical rigid parts 26b and 26c here shown as channel irons. A similar supporting means would be provided at the other end of the arrangement, as may be best seen in Figure 2, this being identified as 27. These two supporting means serve to support therebetween a vertical row of flexible carrying means adapted to have cheeses placed thereon, as the carrying means identified as 28—36 having cheeses 37—45 thereon.

Referring now more particularly to Figure 4, each of the carrying means 28—36 comprises an identical flexible arrangement and accordingly only one such means, as 28, will be described in more detail. This means is here shown as comprising two rigid supporting portions having a width of the order of the width of the cheese block, preferably slightly larger, these parts being here shown as comprising the slats 28a and 28b and the rigid end members 28c and 28d on the one hand, and the slats 28e and 28f and the end members 28g and 28h on the other hand, the entire assembly being identified at 28A and 28B for convenience in later designation. Between these rigid portions 28A and 28B is an intermediate rigid portion of a width of the order of the thickness of the cheese block, or preferably slightly narrower, as the narrow slat 28i. This is mounted on end members 28m and 28n, this whole central assembly for convenience being designated as 28C. The members 28m and 28n are connected to the end members on each side in such manner that there is free pivoting movement between them, as by hooking one of these parts into the other. The result is that the entire carrying means is flexible in the sense that it comprises three parts which can move relative to each other, even though the individual parts of this form are rigid.

Referring now more particularly to Figures 5–8, the manner in which the cheese may be inverted on the carrying means will now be described. When the cheese is resting on the portion 28B of the carrying means the apparatus will be as illustrated in Figures 5 and 6. When it is desired to invert the cheese it is only necessary to grasp the vertically movable parts of the supporting means on one side and at each end, as the part 26b at one end and the downwardly extending vertical parts of the supporting means 27 at the other end, and to pull down on these parts, this causing the other parts 26c and 27c simultaneously to move vertically upward. Whereas the carrying means originally had its parts 28A and 28C extending upward and the part 28B horizontal, this movement of the supporting means causes the parts first to assume the position shown in Figure 7, where the cheese has slid down the upper surface of the part 28B, because of the angle to which it has been moved, and has one edge bearing on the slat of the central part 28C. Further downward movement of the supporting part 28A and upward movement of the part 28C causes the parts finally to assume the position shown in Figure 8, with the part 28A horizontal and with the cheese 37 lying on its upper surface, the parts 28B and 28C now extending upwardly. It will be noted that this process has inverted the cheese, the side of the block 37 which was originally lowermost when lying on the part 28B of the carrying means now being uppermost when it lies on the part 28A. Moreover, since the arrangements of the other carrying means 29—36 of this vertical row are all identical with the means 28 just described, and since they are all supported by the same vertically movable parts of the supporting means, the movements just described effect simultaneous inverting of all the cheeses in the entire vertical row. The difference between merely pulling down the vertical parts on one side of the supporting means, and lifting each heavy cheese block out and inverting it by hand, are readily apparent. Whereas inverting the cheeses of the contents of a curing room by hand now takes six hours or more of the work of strong, well-trained men, all of the cheeses in a curing room equipped with my apparatus can be turned over easily in 15 or 20 minutes by a woman or a boy. No skill in this operation is required, as I provide stop means limiting the movement of the supporting means to the proper range, these stop means being indicated as the balls 26a' and 26a'' in the chain 26a, these being adapted to strike the bottom of the channel members to stop the movement at the desired point in each limit of its operation. This turning operation, while it can be performed quickly and easily, is still done by an operator right at this particular row of cheeses, and with the cheeses fully visible so that any mold, swelling, or other symptoms of spoilage can be noted and reported.

Now referring back more particularly to Figure 3, it will be seen that the overhead trackway is adapted to support a plurality of these cheese carrying arrangements, as has been previously mentioned, all of these arrangements being duplicates of the arrangement D just described. For example, other cheese carrying arrangements here identified as E, F, G, H and I are shown on one side of a handling table K, and similar arrangements are shown on the other side, only the arrangements M and N being visible in this figure. When the cheeses require washing and brushing, cheeses in the arrangement D can be conveniently placed on the table K, washed and brushed, and then replaced; and then the arrangement D can be moved along the trackway until it is adjacent the arrangement M, the table K being moved around to the other side of the arrangement D to lie between it and the cheese carrying arrangement E. The workmen doing the washing can then readily remove the cheeses in the carrying arrangement E, perform whatever handling operations may be necessary, and replace them. This procedure can obviously be repeated throughout the whole curing room, with no necessity of lifting the cheeses on to a hand truck and taking them to the washing location. If some kind of a washing and brushing machine is employed in place of the table the procedure would be the same except that the machine would be used where the table K is now shown.

Initial transferring of the cheeses from the brine vat on to the carrying means, subsequent removal and replacement during any washing or brushing, and eventual removal of the cheeses in the packaging room may be very conveniently and simply accomplished by this apparatus with the use of an ordinary board as a transfer member, this board being preferably only slightly longer and wider than each cheese block, and being short enough to pass between the supporting means at each end of the cheese carrying arrangement. When it is desired initially to place the cheese on one of the carrying means, the cheese would first be placed on the transfer board and then this board laid on one of the rigid portions of the carrying means, with the cheese on top of it, there being no necessity of trying to slide the cheese off or dump it off of the carrying board or transfer board and on to the carrying means where the cheese rests during curing. When the whole vertical row of carrying means has been filled in this manner, the supporting means would be moved to effect inverting of the cheeses and transfer boards, the inverting action, when completed, resulting in the boards lying loosely on top of the cheese. It is obvious that it is then only necessary for the workman to lift off each of these transfer boards and use them to put cheeses in the next row. Similarly, when it is desired to remove the cheese from the carrying means of a row, transfer boards would first be laid on top of each of the cheeses and then the inverting process would be effected. Thereafter it would be very simple and easy for two men, one standing at each end of the cheese block, to lift it off and on to the handling table or any other desired spot. It will thus be apparent that the ability to invert anything lying on the carrying means in a simple and convenient manner, which might be termed in an automatic manner, enables transfer boards to be used without the necessity of sliding cheeses off and on to the transfer board, the transfer board always being under the cheese when it is to lift the cheese or on top of it when the board is to be removed.

Referring now more particularly to Figures 9, 10 and 11, another embodiment of my invention is illustrated. In order to keep the description as short and simple as possible, and since the parts shown in these figures have functions analogous to those of parts heretofore described, reference numerals applied in these figures will be 50 higher than those used on analogous parts described heretofore.

In this form of the invention the channel member 72 is provided with wood rubbing blocks 74 and 75 having grooves in which a cable 76 is movable, this again being provided with stop members in the form of balls 76a' and 76a''. Depending from this cable part are channel or strap iron rigid members 76b and 76c; and hooked or otherwise movably connected to these members is a plurality of carrying means forming a vertical row, only the top carrying means being shown, this being here identified as 78. The carrying means in this case is a flexible piece of sheet material, as heavy canvas, designed to operate in conjunction with a cheese block 87 which is cylindrical in form.

With the carrying means and supporting member in the position shown, the cheese block would be placed on the carrying means 78 in the position shown by use of a transfer member which in this case would preferably comprise a rigid trough member slightly less than a semi-circle in cross section. In any event, with the cheese block in the position shown in Figure 9, pulling down the vertical part 76b of the supporting means, with the accompanying simultaneous upward movement of the part 76c, causes the cheese block 87 to roll along the flexible sheet member 78 and end up in the position shown in Figure 11, rotated 180° from its original position; i. e., inverted in the same manner as the rectangular cheese blocks were inverted, although in a manner suitable to its cylindrical shape.

Referring now more particularly to Figure 12, it will be seen that my invention is adapted for operation where individual cheeses made in conventional manner are to be cured, and that all the advantages of my arrangement are available when each carrying means or curing shelf supports a plurality of individual cheeses, whether of round or rectangular form, as well as when curing is done on large blocks as heretofore described.

The particular form of carrying means shown in Figure 12 corresponds with that shown in Figures 1-8, Figure 12 being a fragmentary view similar to Figure 2. In order to keep the description as brief as possible, reference numerals 100 higher than those used in the description of the first eight figures will be applied to analogous parts. The cheese carrying arrangement again comprises vertical supporting means here shown as comprising the flexible parts 126a and the channel parts 126c on the one end and the flexible part 127a and channel part 127c on the other end. This supporting means is shown as furnishing the support for a vertical row of carrying means or curing shelf arrangements, only two carrying means being shown and being here identified as 128 and 129. The carrying means 128 is shown as having thereon a plurality of individual cheeses of rectangular shape, here identified as 137a—e; and the means 129 is shown as carrying a plurality of individual round cheeses here identified as 138a—e.

These individual cheeses may be of any conventional size in which such cheeses are commercially made, as from a pound or two up, but the action of my carrying means is the same in that a plurality of these cheeses can be inverted very quickly and conveniently merely by operating the supporting means. It will be readily apparent that if the supporting means shown in Figure 12 are moved vertically the carrying means will move (analogously to Figures 5–8) so as to cause the individual cheeses to turn over simultaneously without the necessity of their being removed from and replaced on the surface on which they rest. Moreover, where it is desired to move them to a table or washing or oiling location, the transfer board may be placed on top of the whole group of individual cheeses and the supporting means operated to effect an inversion bringing the transfer board under the cheeses and enabling them to be conveniently lifted off, the reverse operation being used when they are replaced.

While I have shown and described certain embodiments of my invention, it is to be understood that it is capable of many modifications. Changes, therefore, in the construction and arrangement may be made without departing from the spirit and scope of the inventions as disclosed in the appended claims.

I claim:

1. Cheese handling apparatus of the character described, including: a plurality of vertically spaced carrying members adapted to have cheeses placed thereon, each carrying member having a portion thereof movable with respect to another portion of said member to invert a cheese placed on said carrying member, and each carrying member being at least as wide and as long as the cheese carried thereby; and two elongated horizontally spaced vertically extending movable supporting devices having the ends of the carrying members attached thereto intermediate the ends thereof with said members extending therebetween, at least one of said supporting devices being vertically movable for simultaneously moving the entire vertical row of carrying members and inverting the cheeses thereon.

2. The apparatus of claim 1 wherein each of said carrying members comprises a cheese-supporting flexible sheet.

3. The apparatus of claim 1 wherein each of said carrying members comprises a plurality of cheese-supporting rigid members operably connected together for movement relative to each other.

4. Cheese handling apparatus of the character described, including: a plurality of vertically spaced carrying members adapted to have cheeses placed thereon, each carrying member being at least as wide and as long as the cheese carried thereby; and two rigid elongated horizontally spaced vertically extending movable supporting devices having the ends of the carrying members attached thereto intermediate the ends thereof with said members extending therebetween, said supporting devices being interconnected and oppositely vertically movable for simultaneously moving the entire vertical row of carrying members and inverting the cheeses thereon.

5. Cheese handling apparatus of the character described, comprising: a plurality of vertically spaced cheese carrying members; a pair of rigid elongated horizontally spaced and vertically extending movable supporting devices having the ends of the carrying members attached thereto intermediate the ends thereof with said members extending therebetween; and apparatus providing means for moving at least one of said supporting devices in a vertical path relative to the other of said devices to turn all cheeses simultaneously on their carrying members, each of said carrying members having a length such that the ends thereof normally project beyond the cheese supported thereon.

6. The apparatus of claim 5 wherein each of said carrying members comprises a cheese-supporting flexible sheet.

7. The apparatus of claim 5 wherein each of said carrying members comprises a plurality of cheese-supporting rigid members operably connected together for movement relative to each other.

8. Cheese handling apparatus of the character described, comprising: a plurality of vertically spaced cheese carrying members; a pair of rigid elongated horizontally spaced and vertically extending movable supporting devices having the ends of the carrying members attached thereto intermediate the ends thereof with said members extending therebeween, said devices being simultaneously movable in opposite vertical directions; apparatus providing means for vertically moving said devices in opposite directions to turn all cheeses simultaneously on their carrying members; and a trackway on which said pair of supporting devices are movable as a unit, each of said carrying members having a length such that the ends thereof normally project beyond the cheese supported thereon.

RAYMOND MIOLLIS.

REFERENCES CITED

The following references are of record in the file of this patent:

UNITED STATES PATENTS

| Number | Name | Date |
|---|---|---|
| 5,093 | Severance | May 1, 1847 |
| 37,140 | Ainger et al. | Dec. 9, 1862 |
| 457,604 | Irons | Aug. 11, 1891 |
| 798,697 | Perkins | Sept. 5, 1905 |
| 1,498,153 | Cull | June 17, 1924 |
| 1,516,728 | Hiu | Nov. 25, 1924 |
| 1,524,067 | Troutman et al. | Jan. 27, 1925 |
| 1,772,734 | Romine | Aug. 12, 1930 |
| 1,901,614 | Snow | Mar. 14, 1933 |
| 1,911,249 | Stover | May 30, 1933 |
| 1,962,772 | Hull et al. | June 12, 1934 |
| 2,103,545 | Miollis | Dec. 28, 1937 |
| 2,179,910 | Wenger | Nov. 14, 1939 |
| 2,338,285 | Harry | Jan. 4, 1944 |
| 2,366,553 | Petersen | Jan. 2, 1945 |
| 2,433,523 | Mahan et al. | Dec. 30, 1947 |

FOREIGN PATENTS

| Number | Country | Date |
|---|---|---|
| 387,344 | France | May 5, 1908 |
| 14,647 | France | Nov. 11, 1911 |
| 148,092 | Switzerland | Sept. 16, 1931 |